United States Patent
Baumgart et al.

(10) Patent No.: US 9,309,415 B2
(45) Date of Patent: Apr. 12, 2016

(54) ELECTRODEPOSITION PAINT COMPOSITION

(75) Inventors: Hubert Baumgart, Münster (DE); Rolf Schulte, Havixbeck (DE); Günther Ott, Münster (DE); Winfried Kreis, Münster (DE); Thomas Danner, Weinheim (DE); Bernd Sachweh, Meckenheim (DE); Sonja Judat, Ludwigshafen (DE)

(73) Assignee: BASF Coatings GmbH, Munster (DE)

( * ) Notice: Subject to any disclaimer, the term of this patent is extended or adjusted under 35 U.S.C. 154(b) by 501 days.

(21) Appl. No.: 12/992,793

(22) PCT Filed: May 13, 2009

(86) PCT No.: PCT/EP2009/003404
§ 371 (c)(1),
(2), (4) Date: Jan. 25, 2011

(87) PCT Pub. No.: WO2009/138222
PCT Pub. Date: Nov. 19, 2009

(65) Prior Publication Data
US 2011/0266155 A1   Nov. 3, 2011

(30) Foreign Application Priority Data
May 14, 2008  (DE) .......................... 10 2008 023 444

(51) Int. Cl.
  C25D 15/00  (2006.01)
  C09D 5/44   (2006.01)
  C09D 7/12   (2006.01)
  C25D 13/02  (2006.01)
  C25D 13/04  (2006.01)
  C25D 13/14  (2006.01)
  (Continued)

(52) U.S. Cl.
CPC ............ C09D 5/4492 (2013.01); C09D 7/1225 (2013.01); C09D 7/1266 (2013.01);
(Continued)

(58) Field of Classification Search
CPC .. C09D 5/4492; C09D 7/1225; C09D 7/1266; C09D 7/1275; C08K 3/22; C08K 3/28; C08K 3/30; C08K 3/32; C08K 3/34; C08K 3/36; C08K 9/02; C25D 13/02; C25D 13/04; C25D 13/14; C25D 15/00
USPC ............ 204/506, 508; 523/415; 524/493, 497
See application file for complete search history.

(56) References Cited

U.S. PATENT DOCUMENTS

| 5,178,736 A | 1/1993 | Richardson |
| 5,203,975 A | 4/1993 | Richardson |

(Continued)

FOREIGN PATENT DOCUMENTS

| CN | 1056539 A   | 11/1991 |
| DE | 10041038 A1 | 3/2002  |

(Continued)

OTHER PUBLICATIONS

International Preliminary Report on Patentability for International application No. PCT/EP2009/003404 dated Dec. 6, 2010.

(Continued)

*Primary Examiner* — Kishor Mayekar
(74) *Attorney, Agent, or Firm* — Servilla Whitney LLC

(57) ABSTRACT

The present invention relates to electrodeposition primer compositions comprising catalytically active core/shell particles CS. The electrodeposition primer compositions can be used more particularly for cathodic dip coating for the coating of automobile bodies or parts thereof.

15 Claims, 1 Drawing Sheet

(51) Int. Cl.
*C08K 3/22* (2006.01)
*C08K 3/28* (2006.01)
*C08K 3/30* (2006.01)
*C08K 3/32* (2006.01)
*C08K 3/34* (2006.01)
*C08K 3/36* (2006.01)
*C08K 9/02* (2006.01)

(52) U.S. Cl.
CPC .............. *C09D7/1275* (2013.01); *C25D 13/02* (2013.01); *C25D 13/04* (2013.01); *C25D 13/14* (2013.01); *C25D 15/00* (2013.01); *C08K 3/22* (2013.01); *C08K 3/28* (2013.01); *C08K 3/30* (2013.01); *C08K 3/32* (2013.01); *C08K 3/34* (2013.01); *C08K 3/36* (2013.01); *C08K 9/02* (2013.01)

(56) References Cited

U.S. PATENT DOCUMENTS

| | | | |
|---|---|---|---|
| 5,338,434 A | | 8/1994 | Ruhl et al. |
| 8,304,362 B2 * | | 11/2012 | Lopez et al. .................. 502/185 |
| 2004/0024116 A1 * | | 2/2004 | Honnick ....................... 524/800 |
| 2007/0023288 A1 | | 2/2007 | Kuwano et al. |
| 2007/0045116 A1 | | 3/2007 | Hung et al. |
| 2007/0051634 A1 | | 3/2007 | Poole et al. |
| 2007/0149655 A1 | | 6/2007 | Kawaraya et al. |

FOREIGN PATENT DOCUMENTS

| | | | |
|---|---|---|---|
| EP | 0264834 | A1 | 4/1988 |
| EP | 0595341 | A2 | 5/1994 |
| EP | 0859017 | A1 | 8/1998 |
| JP | H0532919 | A | 2/1993 |
| JP | 06-200192 | A | 7/1994 |
| JP | H06264010 | A | 9/1994 |
| JP | H0938483 | A | 2/1997 |
| WO | WO2007/025297 | A2 | 3/2007 |

OTHER PUBLICATIONS

International Search Report for International application No. PCT/EP2009/003404 dated Aug. 18, 2009.

Written Opinion for International application No. PCT/EP2009/003404, dated Aug. 18, 2009.

* cited by examiner

ELECTRODEPOSITION PAINT COMPOSITION

CROSS REFERENCE TO RELATED APPLICATIONS

This application is a National Phase Application of Patent Application PCT/EP2009/003404 filed on 13 May 2009, which claims priority to DE 10 2008 023 444.3, filed 14 May 2008, both of which are hereby incorporated by reference in their entirety.

FIELD OF THE INVENTION

The invention relates to a cathodically depositable electrodeposition primer composition comprising an aqueous binder dispersion, a crosslinker, and a catalyst attached to a finely divided support. The invention also relates to the use of cathodically depositable electrodeposition primer compositions for the coating of conductive workpieces, the conductive workpieces possibly being automobile bodies or parts thereof.

BACKGROUND OF THE INVENTION

Cathodic electrodeposition coating (cathodic electrodip) is a process in which water-thinable coating materials are applied to electrically conducting workpieces by the application of a direct current. The workpiece is immersed in a paint bath and the ionized paint is deposited on the workpiece. The workpiece is then removed from the bath and in a further step the paint is baked. Preferred workpieces here include automobile bodies or parts thereof.

Added to the water-thinable primer systems are crosslinking catalysts such as dibutyltin oxide, for example. It has been observed that, when these catalysts are used, there are instances of cratering in which dibutyltin compounds, as metabolites of the dibutyltin oxide, are causally or cocausally involved. These craters are detrimental to the quality of the paint, and afterwork is frequently required. Hence, on an automobile finishing line, the paint must be sanded, for example, leading to additional costs. As a result of the craters, moreover, the perceived quality of the paint is reduced and its quality standing in the market suffers. Moreover, when using dibutyltin oxide and dioctyltin oxide, instances of precipitation have been observed in the dip tank. In the worst case, these precipitations can result in the loss of the entire dipping primer in the cathodic electrodip tank.

In the cathodic electrodip tank, as a result of entrainment of phosphate from the pretreatment process, there may be increased phosphate levels. If the crosslinking reaction of the electrodeposition coating is catalyzed by tin compounds such as dibutyltin oxide, for example, there may easily be formation of tin phosphate salts, which, as a precipitate, can lead to the formation of slight dents or even distinct craters (circular wetting defect down to the substrate). Moreover, there is a reduction in the level of catalyst in the dip bath, since its instability means that the dibutyltin oxide may gradually break down and may be removed from the bath material as a result of the aforementioned formation of precipitates. As a result there may be deficient crosslinking and a decrease in corrosion resistance.

Dibutyltin oxide and dioctyltin oxide have the disadvantage, furthermore, that they are solid compounds, and must therefore be used in relatively large amounts, as a result of their insolubility in the organic film material, thereby making these catalysts less economic. Since the material in question is a solid, it is also possible, moreover, for defects and craters to occur as a result of inadequate dispersing.

The prior art has disclosed a series of crosslinking catalysts, also called curing catalysts, which can be used in electrodeposition primer compositions, but which do not satisfy the exacting requirements made of a curing catalyst in dipping primers. Thus, for example, European laid-open specification EP 0 264 834 A1 discloses catalytically active metal compounds on organic polymeric supports as additions for an electrodeposition primer composition. EP 0 859 017 A1 describes non-water-compatible catalysts which are applied to a water-dispersible inorganic support in order that said catalysts can be used in aqueous systems too. The U.S. laid-open specification US 2007/0045116 A1 discloses an electrodeposition primer composition featuring a resin phase and catalytically active nanoparticles which are in dispersion in an aqueous medium. This resin phase comprises a curing agent and a resin containing active hydrogen. German patent application DE 100 41 038 A1 discloses $SnO_2$-coated $SiO_2$ particles suitable for the catalysis.

None of these examples discloses uniform distribution of the catalysts or of the catalyst-containing particles in their corresponding dispersions and/or dipping primer compositions. Furthermore, US applications U.S. 2007/0149655 A1, WO 2007/025297 A3, US 2007/0045116 A1 and US 2007/0051634 A1 present unsupported catalysts. In other words, material which in principle is catalytic is used even for the particle core, despite the fact that only the outer layers are catalytically active.

Accordingly it is an object of the present invention to provide electrodeposition primer compositions which comprise support-bound curing catalysts with homogeneous distribution.

This object is achieved by the technical teaching of the independent claims. Advantageous developments are found in the dependent claims, the description, the examples, and the figure.

SUMMARY OF THE INVENTION

Surprisingly it has been found that a cathodically depositable electrodeposition primer composition comprising an aqueous binder dispersion, a crosslinker, and core/shell particles CS, wherein the core/shell particles are composed of a core C and a shell S-forming catalyst and wherein the core is an inorganic and catalytically inert support and the core/shell particles possess a maximum diameter of 1000 nm, and the thickness of the shell S measures not more than 10 nm, and the core/shell particles are preparable by starting from a suspoemulsion of a first, disperse liquid phase I in a second, continuous liquid phase II, which in the first, disperse liquid phase I comprises submicron particles of a core-forming solid C and also a molecularly dispersely dissolved precursor substance PS for the shell and, optionally, a reactant R, and wherein, in the first, disperse liquid phase I of the suspoemulsion, the submicron core/shell particles CS are produced by chemical or physical conversion of the precursor substance PS for the shell, is able to solve the known problems from the prior art.

BRIEF DESCRIPTION OF THE FIGURE

FIG. 1 provides a micrograph (TEM) of $SnO_2$-loaded $SiO_2$ particles.

DETAILED DESCRIPTION OF AN EMBODIMENT OF THE INVENTION

The dispersions comprising curing catalysts form aqueous and stable dispersions and are particularly suitable as a component for cathodically depositable dipping primers. An aqueous, stable dispersion of inventive core/shell particles, prepared beforehand for a dipping primer, can be processed and stored to good effect on the basis of the homogeneous distribution of the particles and the outstanding rheological properties of the dispersion. Moreover, in relation to the unsupported catalysts known from the prior art, it is possible to achieve material savings, since the cost-effective $SiO_2$ is used with preference as a support according to the invention. The dipping primer compositions presented in this application, comprising catalyst-bearing particles with a core/shell construction, can therefore be mass-produced inexpensively as compared with catalysts according to the prior art. Since an inorganic and catalytically inert support is used for the particles of the invention, and one on which the catalytic metal oxides are preferably immobilized dispersely and separately from one another, the specific surface area of the catalyst that is available is extremely high. This advantage is absent from prior-art unsupported catalysts. Accordingly the electrodeposition primer composition described herein, comprising catalyst-bearing particles, is able to develop a higher catalytic activity for reduced consumption of material. Furthermore, owing to the immobilization of the catalyst material on the core, a reduction is achieved in the diffusion coefficient, which reduces or prevents entirely the passage of the catalyst from the cathodic electrodeposition primer film into paint films applied over it.

The electrodeposition primer compositions of the invention that are presented in this specification, comprising core/shell particles as curing catalysts for the crosslinking reactions in coating materials, therefore solve the problems known from the prior art to be associated with support-bound catalysts.

The core/shell particles of the electrodeposition primer compositions of the invention are prepared by a suspoemulsion process, which will be described below.

Suspensions are, as is known, mixtures comprising a disperse solid phase in a continuous liquid phase.

Emulsions are liquidly disperse systems composed of two mutually immiscible liquid phases, of which one phase, termed the disperse or internal phase, is present in dispersion in the second phase, referred to as the continuous or homogeneous phase, in the form of fine droplets. Depending on the polarity of the phases, emulsions are referred to as oil-in-water (O/W) or water-in-oil (W/O) emulsions; in the first case, an oil phase composed of nonpolar media is present in the form of finely dispersed droplets in a polar phase consisting of an aqueous solution or of other compounds not miscible with the nonpolar phase. In the case of the W/O emulsion, conversely, the polar phase is in the form of finely dispersed droplets in the oil phase. The fraction of the disperse phase as a proportion of the emulsion as a whole may be situated within a range from >0% to <100%.

The term "miniemulsions" is used for thermodynamically unstable, liquidly disperse systems (emulsions) which are stabilized by steric and/or electrostatic effects and/or by one or more surfactants and/or by further auxiliaries, and whose disperse phase has an average droplet diameter ≤5000 nm (≤5 µm).

The term suspoemulsion is used for mixtures which have particulate solids distributed in an emulsion, and, correspondingly, a minisuspoemulsion is a miniemulsion having particulate solids distributed therein.

A miniemulsion can be produced, for example, with supply of mechanical energy, in the form for example of stirring energy, turbulent kinetic energy, ultrasonic waves, pressure with subsequent release via a homogenizing valve, by means of static mixers, micromixers or membranes, or, generally, by application of laminar or turbulent shearing and/or stretching flows and cavitation. The resultant type of emulsion (W/O emulsion or O/W emulsion) is determined by the selection of the physical system and the concentration of the disperse and continuous phases, of the surfactant or surfactants and/or of the auxiliaries used.

A prerequisite for emulsification is that the droplets are sufficiently stable in the miniemulsion or in the suspoemulsion for the duration of the preparation of core/shell particles. Depending on the physical system, this may be so as a result of surface charging, i.e., electrostatic repulsion, of the droplets. Where external stabilization of the droplet phase by surfactants is required, it can be accomplished via electrostatic and/or steric effects, which are brought about by suitable stabilizing assistants, or via Pickering stabilizers (surface-active particles) which are present in the liquid, continuous phase. The liquid, disperse phase may also comprise assistants for stabilizing the particles and/or the emulsion. Assistants for stabilizing the miniemulsion or the submicron suspension also include substances which alter the rheological properties of the continuous phase in such a way as to retard or prevent thickening or sedimentation of the droplets or of the particles of the disperse phase.

Phases are presently referred to as liquid if they are in the liquid aggregate state under the conditions of the presently described processes.

The term "submicron particles of a core-forming solid C" also refers to submicron particles of one or more core-forming solids C. In the same way, a molecularly dispersely dissolved precursor substance PS for the shell also comprehends two or more molecularly dispersely dissolved precursor substances PS for the shell, and a molecularly dispersely dissolved precursor substance PC for the core also comprehends two or more molecularly dispersely dissolved precursor substances PC for the core.

It has been found that it is possible to form the shell on the solid cores from the molecularly dispersely dissolved precursor substances in the droplets of a first liquid phase I which comprise not only the one or more core-forming solids but also the one or more molecularly dispersely dissolved precursor substances of the shell-forming solid. In this case the droplets of the first liquid phase I, on account of their small dimensions—the system in question is a minisuspoemulsion and, accordingly, as defined at the outlet, comprises average droplet diameters of the disperse phase of ≤5 µm—function as mini-reactors, which ensure that the given polydispersity of the initial submicron suspension of the core-forming solids is substantially retained.

For this purpose the starting point is a suspoemulsion of a first, disperse liquid phase I in a second, continuous liquid phase II, which in the first, disperse liquid phase I comprises submicron particles of a core-forming solid C and also a molecularly dispersely dissolved precursor substance PS for the shell.

In one embodiment the above suspoemulsion further comprises a reactant R.

The suspoemulsion described above can be prepared in a first embodiment by
   starting from a suspension of the submicron particles of the core-forming solid C in the first liquid phase I,
   adding thereto the precursor substance PS for the shell and subjecting it to molecularly disperse dissolution, and subsequently
   adding the second liquid phase II and emulsifying it, with supply of energy, with the first liquid phase I.

In a further embodiment the above suspoemulsion is prepared by
- starting from a suspoemulsion of submicron particles of a core-forming solid C in the first liquid phase I as disperse phase, in the second liquid phase II as continuous phase,
- introducing the precursor substance PS for the shell in a third liquid phase III, which is miscible with the first liquid phase I but not miscible with the second liquid phase II, and
- forming an emulsion from the third liquid phase III comprising the precursor substance PS, with a fourth liquid phase IV, which is miscible with the second liquid phase II but not with the first and the third liquid phase III, with input of energy, and,
- through input of energy, causing coalescence of the droplets of the first liquid phase I and the droplets of the third liquid phase III.

In this embodiment, therefore, the disperse phase of a first suspoemulsion, comprising, in the droplets of the disperse phase, the submicron particles of the core-forming solid, is brought to forced coalescence with the disperse phase of a second emulsion, comprising, in the droplets of the disperse phase, the precursor substance PS for the shell.

In a further embodiment the above suspoemulsion is provided which comprises, in the droplets of the disperse phase, in addition to the submicron particles of the core-forming solid C and the molecularly dispersely dissolved precursor substance PS for the shell, a reactant R. For this purpose
- the starting point is a suspoemulsion of submicron particles of a core-forming solid C and also a molecularly dispersely dissolved precursor substance PS for the shell in the first liquid phase I as disperse phase, in the second liquid phase II as continuous phase,
- after which a reactant R either is added in the second, continuous liquid phase II and diffuses into the droplets of the first, disperse liquid phase I, or
- is added in a further liquid phase V, which is miscible with the first, disperse liquid phase I but not with the second, continuous liquid phase II,
- an emulsion is formed from the further liquid phase V, comprising the reactant R, with an additional liquid phase VI, with input of energy, and the droplets of said emulsion, consisting of phase V,
- are brought to forced coalescence with the droplets of the first, disperse liquid phase I comprising the core-forming solid C and also the precursor substance PS for the shell.

In a further embodiment the above suspoemulsion comprising, in addition to the submicron particles of the core-forming solid C and the molecularly dispersely dissolved precursor substance PS for the shell, the reactant R, is prepared by forced coalescence of the droplets of a suspoemulsion comprising the submicron particles of the solid C and the reactant R with the droplets of a further emulsion comprising, in the droplets of the disperse phase, the precursor substance PS for the shell.

The preparation of the suspoemulsion comprising the submicron particles of the core-forming solid C in the first, disperse liquid phase I, with the second liquid phase II as continuous phase, can take place in the same way as for the above-described preparation process for the suspoemulsion comprising, in the droplets of the disperse phase, the submicron, core-forming particulate solids C, the molecularly dispersely dissolved precursor substance PS for the shell, and, where appropriate, the reactant R. In a first embodiment for this purpose
- the starting point is a miniemulsion comprising a precursor substance PC for the core-forming solid in the first, disperse liquid phase I, the second liquid phase II being the continuous phase, and forming therefrom, by physical or chemical conversion of the precursor substance PC of the core-forming solid, the minisuspoemulsion of the core-forming solid C in the first, disperse liquid phase I with the second liquid phase II as continuous phase.

In a further embodiment for this purpose
- the starting point is a miniemulsion comprising a precursor substance PC for the core-forming solid in the first, disperse liquid phase I, the second liquid phase II being the continuous phase,
- after which a reactant R either is added to the second, continuous liquid phase II and diffuses into the droplets of the first liquid phase I, or
- is added to a third liquid phase III, which is miscible with the first liquid phase I but not miscible with the second liquid phase II, and
- an emulsion is formed from the third liquid phase III, comprising the reactant R, with a fourth liquid phase IV, which is miscible with the second liquid phase II but not with the first and the third liquid phase, with input of energy, and its droplets of the disperse, liquid phase III are brought to forced coalescence with the droplets of the first, disperse liquid phase I, comprising the precursor substance PC for the core-forming solid, and after which
- the precursor substance PC for the core-forming solid C is brought to chemical reaction with the reactant R.

In the embodiment in which the submicron core/shell particles are prepared from the suspoemulsion comprising, in the droplets of the disperse phase, the submicron particles of the core-forming solid C and also the molecularly dispersely dissolved precursor substance PS for the shell, by physical conversion of the precursor substance PS for the shell, the physical conversion may be more particularly the changing of one or more process parameters, preferably the temperature and/or the pressure, or else the addition of a solvent or a salt, in analogy to the above-described addition of a reactant R. The physical conversion may occur more particularly by cooling or by evaporation of the solvent of the dissolved solid or solids of the shell and/or of the core, or by addition of a further solvent, in analogy to the above-described addition of a reactant R, that lowers the solubility of the dissolved solid or solids of the shell and/or of the core, or by addition of one or more further salts, in analogy to the above-described addition of a reactant R, which lower the solubility of the dissolved solid or solids of the shell and/or of the core.

The term "submicron particles" is known to refer to particulate solids whose average outer diameters are below one micrometer.

The average outer diameter of the core of the nanoparticles is preferably $\geq 10$ nm and $\leq 900$ nm, more preferably $\geq 10$ nm and $\leq 500$ nm, and, with more particular preference, $\geq 10$ nm and $\leq 250$ nm.

The thickness of the shell of the submicron core/shell particles is preferably in a range of $\geq 0.5$ nm and $\leq 50$ nm, more preferably $\geq 1$ nm and $\leq 8$ nm, and, with more particular preference, $\geq 1$ nm and $\leq 5$ nm.

The thickness of the shell can be calculated as follows: 0.5(diameter of core/shell particles–diameter of core). The diameter of the core and the diameter of the core/shell particles can be determined, for example, by a measurement by means of transmission electron microscopy (TEM).

Since the particles presented in this specification are submicron core/shell particles, the sum of the diameters of core and shell never exceeds 1000 nm. The sum of the diameters of core and shell can amount at most to 1000 nm.

The shell surrounds the core completely or surrounds the core only partially.

The term "shell" also embraces discrete particles on the core particles. These particles may have, for example, the function of a catalyst. When the catalyst particles have been applied to the support, they are arranged as discrete particles bordering one another or spaced apart on the support's surface.

The submicron core particles, discrete shell particles, and core/shell particles ideally have a spherical structure. However, deviations from this ideal structure are also possible. These deviations may occur, for example, in the form of small elevations or depressions on the surface of the core/shell particles. Nevertheless, the submicron core particles, discrete shell particles, and the core/shell particles possess a substantially ideally spherical three-dimensional geometry.

The particle size can be determined from electron micrographs.

The dipping primer of the invention contains the core-forming solid or solids C preferably in a fraction of 0.01% to 40% by weight, more particularly in a fraction of 1% to 10% by weight, based on the total weight of the dipping primer.

The core-forming solid C (support) is more particularly a substance or a mixture of substances selected from the group consisting of $SiO_2$, $TiO_2$, $Al_2O_3$, $ZrO_2$, $Fe_2O_3$, and $Fe_3O_4$. Preference here is given to $SiO_2$ and $TiO_2$.

Certain of the inorganic oxides listed above occur in different modifications. For instance, $TiO_2$ occurs in the modifications rutile, anatase, and brookite; the aluminum oxide modifications encompass cubic $\gamma$-$Al_2O_3$ or rhombohedral $\alpha$-$Al_2O_3$.

The support materials used herein are not subject to any restriction in the choice of modifications.

As already mentioned, $SiO_2$ is one preferred support material. When $SiO_2$ is used as support material for the core/shell particles, precipitated silica is preferred. Using fumed silica for dispersions results in agglomerates. Where these materials are used as supports for catalysts, and where the resulting core/shell particles are used, say, for an aqueous dispersion, the size distribution of the core/shell particles in the dispersion is inhomogeneous. The inhomogeneities caused by the agglomerate superstructures often give rise to unwanted rheological side effects in dispersions and also in electrodeposition primers. Therefore the standard catalysts are typically ground with a grinding resin, thus partly breaking down the agglomerate structure. As a result of the homogeneous distribution of the core/shell particle dispersions presented here, such deagglomeration steps can be omitted before the core/shell particles are added to the dipping primer composition. The dispersions can be added to the dipping primer composition without further processing. In this way it is possible to produce very stable dispersions, which means that the particles of the invention settle only to a very small extent, or not at all, in the dipping primer composition.

The catalyst (shell S) may be selected from the group consisting of ZnO, SnO, $SnO_2$, $Bi_2O_3$, $Ce_2O_3$, $CeO_2$, CuO, $Cu_2O$, $WO_3$, $Y_2O_3$, $La_2O_3$, $MnO_2$, $MoO_3$, $Nd_2O_3$, $NdO_2$, $VO_2$, $VO_3$, $V_2O_5$ or mixtures thereof. Preference here is given to SnO and $SnO_2$.

Certain of the oxides presented above as catalyst materials occur in different modifications. The catalyst materials used herein are not subject to any restriction in the choice of modifications.

As already mentioned, it is also possible, additionally, for a reactant R to be used as well. The reactant may be, for example, a soluble organic base, more particularly an amine, or a water-soluble base, such as an aqueous sodium hydroxide or potassium hydroxide solution, or else a gas such as carbon dioxide or ammonia, a reducing agent ($H_2$, $NaBH_4$), an oxidizing agent, initiators, a buffer solution, or ion exchange resins.

Of the two liquids which are not miscible with one another, one is hydrophilic and the other is hydrophobic.

Preferably the first, disperse liquid phase I is aqueous and the second, continuous liquid phase II is an organic phase, more particularly an alkane or a mixture of alkanes, a vegetable oil or a mixture of vegetable oils, a silicone oil or a mixture of silicone oils, or a mixture of the substances recited.

In one version the first, disperse liquid phase I or the second, continuous liquid phase II can be stripped from the minisuspoemulsion of the submicron core/shell particles to give a suspension of submicron core/shell particles in the respectively other liquid phase.

With advantage it is possible to apply two to ten, preferably two to three, shells one over the other to the core-forming particles. With particular preference, however, only one catalyst layer is applied.

In one advantageous embodiment the core and the one or more shells may each have the same chemical composition but a different modification, more particularly a different crystal structure, or the material of the core can be amorphous and the material of the one or more shells can be crystalline, or vice versa.

In another embodiment a minisuspoemulsion of submicron core/shell particles is prepared in which the shell does not completely surround the core, after which the submicron core/shell particles are subjected to a downstream process step in which some or all of the core is removed, more particularly by evaporation, dissolution or etching, with retention of a hollow structure, and, subsequently, a further shell or two or more further shells can preferably be applied to said hollow structure.

As already mentioned, the particles formed in this way from core and shell ideally have a spherical structure. In the case of a multiple shell construction, however, structures which deviate slightly from this ideal structure are also possible.

The particles can be processed to a dispersion and said dispersion can be used as a component for the electrodeposition primer composition of the invention. The metal content of the catalyst of the core/shell particles in the electrodeposition primer composition is in this case between 2.5-10 mmol of metal relative to 100 g of binder solids.

The submicron core/shell particles prepared by the process described above can be used for the catalysis of crosslinking reactions in electrodeposition primers, preferably in cathodically depositable electrodeposition primer compositions.

The invention is described in more detail below by means of a figure and working examples.

FIG. 1: Electron micrograph (TEM) of $SnO_2$-loaded $SiO_2$ particles. The $SiO_2$ support particles have a diameter of 20-130 nm and are covered with $SnO_2$ particles measuring 2-4 nm (diameter). In FIG. 1, the $SnO_2$ elevations on the $SiO_2$ particles are visible as dark areas. The $SnO_2$ catalyst particles are arranged as discrete particles bordering one another or spaced apart on the surface.

EXAMPLES

Example 1

Production of Core/Shell Particles

The core/shell particles were produced by the miniemulsion process described above, with an Si:Sn molar ratio of 10:1.

Starting material used for preparing the miniemulsion was a 45% strength (% by mass) aqueous suspension, from the company H.C. Starck (Levasil 100/45%), of $SiO_2$. This suspension was diluted with 29.77% by mass of DI water (based on the emulsion) to a final concentration of 2.5% by mass of $SiO_2$, based on the $SiO_2$ solids fraction (in the emulsion). Subsequently $SnCl_4 \times 5\ H_2O$ (1.07% by mass based on the emulsion) was dissolved in the aqueous suspension. In a parallel batch, 1.50% by mass (based on the emulsion) of Span 80 (sorbitan monoleate) from the company Roth (Karlsruhe, Germany) were dissolved in 65.17% by mass (based on the emulsion) of n-decane. The two liquid phases were then combined and subjected to preemulsification using a rotor-stator stirrer from the company Ultra-Turrax. This formed aqueous droplets, containing $SiO_2$ particles and dissolved $SnCl_4$, in a continuous n-decane solution containing dissolved Span 80.

The crude emulsion thus obtained was subsequently reemulsified with a high-pressure homogenizer (differential pressure 1000 bar), thus forming droplets of ≤1 μm.

This emulsion was subsequently introduced with triethylamine (the molar ratio of triethylamine to Sn was 6:1) in a stirred pressure vessel and heated to 130° C. This temperature was held for 4 hours. In this way, $SnO_2$ catalyst particles measuring 2-4 nm were formed, as discrete particles which were arranged in some cases bordering one another and in some cases spaced apart on the $SiO_2$ surface (see also FIG. 1).

By means of multiple centrifuging, removal of the supernatant, and making-up again with liquid, the particles formed were washed. The particles thus obtained were redispersed in DI water. The total solids content of the particles was 12% by mass, with $SnO_2$ accounting for 20%, and $SiO_2$ 80%, of the total mass of solids.

Example 2

Preparation of a Crosslinker for an Electrodeposition Primer Composition

A crosslinker is prepared in accordance with EP 0 961 797 B1:

A reactor equipped with a stirrer, reflux condenser, internal thermometer, and inert gas inlet was charged with 1084 g of isomers and higher polyfunctional oligomers based on 4,4'-diphenylmethane diisocyanate, with an NCO equivalent weight of 135 (Basonat® A270, BASF; NCO functionality about 2.7; 2,2'- and 2,4'-diphenylmethane diisocyanate content below 5%) under a nitrogen atmosphere. 2 g of dibutyltin dilaurate were added and 1314 g of butyl diglycol were added dropwise at a rate such that the product temperature remained below 70° C. After the end of the addition, the temperature was held at 70° C. for a further 120 minutes. In the course of the subsequent check, NCO groups were no longer detectable. The batch was cooled to 65° C. The solids content was >97% (1 h at 130° C.).

Example 3

Preparation of the Low-Solvent Aqueous Binder Dispersion Comprising a Cathodically Depositable Synthetic Resin and a Crosslinker A binder dispersion is prepared in accordance with EP 0 961 797 B1:

A laboratory reactor heated by heat transfer oil and equipped with stirrer, reflux condenser, thermometer, and inert gas inlet tube was charged with 1128 parts of a commercial epoxy resin based on bisphenol A, having an epoxide equivalent weight (EEW) of 188, 262 parts of dodecylphenol, 31.4 parts of xylene, and 228 parts of bisphenol A, and this initial charge was heated to 127° C. under nitrogen. With stirring, 1.6 g of triphenylphosphine were added, whereupon there was an exothermic reaction and the temperature rose to 160° C. It was cooled again to 130° C. and then the epoxide content was checked. The EEW of 532 indicated that >98% of the phenolic OH groups have reacted. At this point 297.5 parts of Pluriol P 900 (polypropylene glycol MW 900, BASF) were added with simultaneous cooling. 5 minutes later, at 120° C. and with further cooling, 105 parts of diethanolamine were added. When, after a brief exotherm (Tmax 127° C.), the temperature had dropped to 110° C. (30 minutes) 51 parts of N,N-dimethylaminopropylamine were added. After a brief exotherm (Tmax 140° C.) the batch was reacted further at 130° C. for 2 hours until the viscosity remained constant (1.8 dPas, plate/cone viscosimeter at 23° C., 40% strength in Solvenon PM (BASF)). Then, with simultaneous cooling, 58.5 parts of butyl glycol and 887.8 parts of the crosslinker (example 5.1) were added and the product was discharged at 105° C.

2100 parts of the still-hot mixture were immediately dispersed with vigorous stirring in a pre-prepared mixture of 1945 parts of fully deionized water (DI water) and 33.1 parts of glacial acetic acid. Following brief homogenization, the dispersion was diluted with a further 1404 parts of DI water and filtered via K900 plate filters (from Seitz). The characteristics of the dispersion were as follows:

| | |
|---|---|
| Solids (1 h at 130° C.): | 35.7% |
| MEQ base | 0.657 meq/g resin solids |
| MEQ acid | 0.283 meq/g resin solids |
| pH | 5.4 |
| Average particle size | 125 nm (light scattering method) |
| Sedimentation stability | no sediment after 3 months' storage at room temperature |
| Viscosity | 14 sec. (DIN4 cup at 23° C.) |

Example 4

Cationic, Water-Soluble Grinding Resin

In accordance with EP 505 445 B1, example 1.3, a grinding resin is prepared which for greater ease of handling is additionally neutralized and diluted with 2.82 parts of glacial acetic acid and 13.84 parts of DI water. The original solids content is thereby lowered to 60%.

Example 5

Aqueous Pigment Pastes

In accordance with the method described in EP 505 445 B1, aqueous pigment pastes are prepared from the starting materials (% by weight) set out in the table below (tab. 1).

TABLE 1

Comparative and inventive pigment pastes

|  | Paste 1 comparative | Paste 2 |
|---|---|---|
| grinding resin from example 4 | 40 | 40 |
| fully deionized water | 7 | 7 |
| dibutyltin oxide | 3 |  |
| carbon black | 0.5 | 0.5 |
| bismuth subsalicylate | 3 |  |
| aluminum silicate | 8 | 8 |
| titanium dioxide | 36 | 36 |

Example 6

Preparation of the Electrocoating Baths and Deposition of the Primer Films

For testing as cathodically depositable electrodeposition primers, the aqueous binder dispersion described in example 3 and the pigment pastes listed in tab. 1 are combined to give the dipping primer baths indicated in table 2. As a comparison, dipping bath 1 is prepared. The dispersion from example 1, containing core/shell particles of the invention, and paste 2 from table 1 are introduced into dipping baths 2-4. The procedure is to introduce the binder dispersion initially and to dilute it with deionized water. Subsequently, with stirring, the pigment paste and the dispersion from example 1, containing core/shell particles of the invention, are introduced. The figures reported correspond to weight fractions (g).

TABLE 2

Comparative and inventive electrocoating baths

|  | Dipping bath 1 comparative | Dipping bath 2 | Dipping bath 3 | Dipping bath 4 |
|---|---|---|---|---|
| fully deionized water | 2434 | 2434 | 2434 | 2434 |
| binder dispersion from example 3 | 2315 | 2315 | 2315 | 2315 |
| paste 1 (comparative) | 289 |  |  |  |
| paste 2 |  | 289 | 289 | 289 |
| dispersion from example 1 containing core/shell particles |  | 207 | 414 | 621 |

The electrodeposition primer baths are aged at room temperature with stirring for 3 days. The primer films are deposited over 2 minutes at a deposition voltage of 220 volts and a breakthrough voltage of 350 volts (bath temperature 29° C.) onto cathodically connected, zinc-phosphatized steel test panels without a Cr(VI) rinse in the pretreatment process.

TABLE 3 pH levels, conductivities, and coat thicknesses of the inventive cathodic dip coatings

|  | Dipping bath 1 comparative | Dipping bath 2 | Dipping bath 3 | Dipping bath 4 |
|---|---|---|---|---|
| pH value | 5.74 | 5.68 | 5.76 | 5.82 |
| conductivity (mS/cm) | 1.81 | 1.79 | 1.90 | 1.83 |
| coat thickness (µm) | 20 | 20 | 21 | 22 |

The deposited films are rinsed with deionized water and baked at 175° C. (article temperature) for 15 minutes (and also at 160° C. for the determination of the glass transition temperature, Tg, as a measure of the crosslinking).

TABLE 4

Glass transition temperatures Tg of the inventive cathodic dip coatings (determined by means of DSC*)

|  | Dipping primer 1 Comparative | Dipping primer 2 | Dipping primer 3 | Dipping primer 4 |
|---|---|---|---|---|
| Tg (160° C.) | 62 | 53 | 59 | 64 |
| Tg (175° C.) | 88 | 80 | 86 | 91 |

*According to DIN 53765 (03.1994)-section 7.1 glass transition: Testing of plastics and elastomers-thermal analysis-dynamic differential calorimetry (DDC)

The resistance of the bath to addition of phosphate is investigated by means of the test described.

Example 7

Testing of a Cathodic Dip Coating for Crater Sensitivity with Respect to Tin Phosphate Craters As described, owing for example to phosphate entrainment from the pretreatment process, there may be increased levels of phosphate in the cathodic dip tank and, as a result, it is possible for tin phosphate salts to be formed. As a precipitate, these salts may lead to the formation of slight dents or even distinct craters. The sensitivity of a cathodic dip coating to additions of phosphate is tested by adding sodium hydrogen phosphate and acidifying the dipping bath (determined in accordance with DIN 53765; see "*" earlier on above).

Procedure: To test the comparative (see above) and the inventive dipping baths, L-shaped metal test panels (10×20 cm, bent centrally) are coated, then left in the bath for a further 15 minutes, and the horizontally coated part of the surface is assessed. After the blank samples have been produced, the baths are admixed with 100 ppm of disodium hydrogen phosphate dodecahydrate (1.88 g of the salt in 50 ml of fully deionized water for 5 kg of bath material) and stirred for 24 hours. Following adjustment of the pH to 5.5 using 85% formic acid, stirring is carried out again for 24 hours, followed by deposition.

TABLE 5

Results of crater sensitivity

|  | Dipping bath 1 | Dipping bath 2 | Dipping bath 3 | Dipping bath 4 |
|---|---|---|---|---|
| L-shape panel | no craters | no craters | no craters | no craters |
| L-shape panel + 15' in the bath | no craters | no craters | no craters | no craters |
| +100 ppm $PO_4^{3-}$ and formic acid to a pH of 5.5 |  |  |  |  |
| L-shape panel | >100 craters | no craters | no craters | no craters |
| L-shape panel + 15' in the bath | >1000 craters | <10 craters | <10 craters | <10 craters |

What is claimed is:

1. A cathodically depositable electrodeposition primer composition comprising:
   an aqueous binder dispersion;
   a crosslinker; and
   a homogeneous distribution of core/shell particles CS consisting of nanoparticles of a core-forming solid C of an inorganic and catalystically inert support and a shell S-forming catalyst that forms a shell S having a thickness that measures not more than 50 nm;

wherein the core/shell particles CS have a maximum diameter of 1000 nm and the core C has an average outer as-prepared diameter in the range of 10 nm to 900 nm, wherein the shell S-forming catalyst, is disposed, in the form of discrete particles bordering one another or spaced apart directly on the surface of the core C, wherein the core/shell particles CS are prepared by providing a suspoemulsion of a first, disperse liquid phase I in a second, continuous liquid phase II, wherein the first, disperse liquid phase I comprises the nanoparticles of the core-forming solid C, a molecularly dispersely dissolved precursor substance PS for the shell and, optionally, a reactant R, and producing, in the first, disperse liquid phase I of the suspoemulsion, the submicron core/shell particles CS by chemical or physical conversion of the precursor substance PS for the shell.

2. The cathodically depositable electrodeposition primer composition of claim 1, wherein the suspoemulsion of the first, disperse liquid phase I in the second, continuous liquid phase II, comprising in the first, disperse liquid phase I the submicron particles of the core-forming solid C and also the molecularly dispersely dissolved precursor substance PS for the shell, is prepared by starting from a suspension of the submicron particles of the core-forming solid C in the first liquid phase I, adding thereto the precursor substance PS for the shell and subjecting it to molecularly disperse dissolution, and subsequently adding the second liquid phase II and emulsifying it, with supply of energy, with the first liquid phase I.

3. The cathodically depositable electrodeposition primer composition of claim 1, wherein the suspoemulsion of the first, disperse liquid phase I in the second, continuous liquid phase II, comprising in the first, disperse liquid phase I the submicron particles of the core-forming solid C and also the molecularly dispersely dissolved precursor substance PS for the shell, is prepared by starting from a suspoemulsion of submicron particles of a core-forming solid C in the first liquid phase I as disperse phase, in the second liquid phase II as continuous phase, introducing the precursor substance PS for the shell in a third liquid phase III, which is miscible with the first liquid phase I but not miscible with the second liquid phase II, and forming an emulsion from the third liquid phase III, comprising the precursor substance PS, with a fourth liquid phase IV, which is miscible with the second liquid phase II but not with the first and the third liquid phase III, with input of energy, and, through input of energy, causing the coalescence of the droplets of the first liquid phase I and the droplets of the third liquid phase III.

4. The cathodically depositable electrodeposition primer composition of claim 1, wherein the suspoemulsion of the first, disperse liquid phase I in the second, continuous liquid phase II, comprising in the first, disperse liquid phase I the submicron particles of the core-forming solid C, the molecularly dispersely dissolved precursor substance PS for the shell, and the reactant R, is prepared by starting from a suspoemulsion of submicron particles of a core-forming solid C and also from a molecularly dispersely dissolved precursor substance PS for the shell in the first liquid phase I as disperse phase, in the second liquid phase II as continuous phase, after which a reactant R either is added in the second, continuous liquid phase II and diffuses into the droplets of the first, disperse liquid phase I, or is added in a further liquid phase V, which is miscible with the first, disperse liquid phase I but not with the second, continuous liquid phase II, and an emulsion is formed from the further liquid phase V, comprising the reactant R, with an additional liquid phase VI, with input of energy, and the droplets of said emulsion are brought to forced coalescence with the droplets of the first, disperse liquid phase I comprising the core-forming solid C and also the precursor substance PS for the shell.

5. The cathodically depositable electrodeposition primer composition of claim 1, wherein the suspoemulsion of the first, disperse liquid phase I in the second, continuous liquid phase II, comprising in the first, disperse liquid phase I the submicron particles of the core-forming solid C, the molecularly dispersely dissolved precursor substance PS for the shell, and the reactant R, is prepared by starting from a suspoemulsion of a first, disperse liquid phase I in a second, continuous liquid phase II, which in the first, disperse liquid phase I comprises submicron particles of a solid C, introducing a reactant R in a third liquid phase III, which is miscible with the first liquid phase I but not miscible with the second liquid phase II, and forming an emulsion from the third liquid phase III, comprising the reactant R, with a fourth liquid phase IV, with input of energy, and causing the coalescence of the droplets of the first liquid phase I and the droplets of the third liquid phase III, with input of energy, after which the precursor substance PS for the shell either is added to the second, continuous liquid phase II and diffuses into the droplets of the first, disperse liquid phase I or is added in the form of a further emulsion comprising the precursor substance PS for the shell in the droplets of the disperse phase thereof, the disperse phase of the further emulsion being miscible with the first, disperse liquid phase I but not with the continuous liquid phase II, and the continuous phase of the further emulsion being miscible with the first, continuous phase II, and after which the droplets of the first, disperse liquid phase I and the droplets of the liquid phase of the further emulsion are brought to forced coalescence.

6. The cathodically depositable electrodeposition primer composition of claim 1, wherein the suspoemulsion comprising the submicron particles of the core-forming solid C in the first, disperse liquid phase I with the second liquid phase II as continuous phase is prepared by starting from a miniemulsion comprising a precursor substance PC for the core-forming solid of the first, disperse liquid phase I, the second liquid phase II being the continuous phase, and forming therefrom, by physical or chemical conversion of the core-forming precursor substance PC, a minisuspoemulsion of the core-forming solid C in the first, disperse liquid phase I with the second liquid phase II as continuous phase.

7. The cathodically depositable electrodeposition primer composition of claim 1, wherein the core/shell particles are substantially spherical particles.

8. The cathodically depositable electrodeposition primer composition of claim 1, wherein the core C of the core/shell particles CS possesses a shape selected from at least one of a needle shape, a cone shape or a polyhedron shape selected from the group consisting of tetrahedron, octahedron, pentagonal bipyramid, and icosahedron.

9. The cathodically depositable electrodeposition primer composition of claim 1, wherein the shell S-forming catalyst forms a closed shell around the core.

10. The cathodically depositable electrodeposition primer composition of claim 1, wherein the core is selected from the group consisting of $SiO_2$, $TiO_2$, $ZrO_2$, $Fe_2O_3$, $Fe_3O_4$, $Al_2O_3$, $MFe_xO_y$, phyllosilicates, semiconductors selected from the group consisting of sulfides, selenides, nitrides, arsenides, phosphides, and antimonides, and mixtures of two or more of the abovementioned materials, M being a transition metal or a main group element, and x and y being selected independently of one another and denoting an integer from 1 to 4.

11. The cathodically depositable electrodeposition primer composition of claim 1, wherein the shell S-forming catalyst is selected from the group consisting of ZnO, $Ce_2O_3$, $CeO_2$, CuO, $Cu_2O$, SnO, $SnO_2$, $Bi_2O_3$, $WO_3$, $Y_2O_3$, $La_2O_3$, $MnO_2$, $MoO_2$, $Nd_2O_3$, $NdO_2$, $VO_2$, $VO_3$, and $V_2O_5$.

12. The cathodically depositable electrodeposition primer composition of claim 1, wherein the metal content of the shell S-forming catalyst of the core/shell particles CS is between 2.5-10 mmol of metal relative to 100 g of binder solids.

13. The cathodically depositable electrodeposition primer composition of claim 1, wherein the homogeneous distribution of core/shell particles CS are added to the aqueous binder dispersion in the absence of a deagglomeration step.

14. A method of coating a conductive workpiece, comprising applying the cathodically depositable electrodeposition primer composition of claim 1 to at least one surface of the conductive workpiece.

15. The method of claim 14, wherein the workpieces are automobile bodies or parts thereof.

* * * * *